United States Patent
Wimmer (10) Patent No.: US 9,784,937 B2
(45) Date of Patent: Oct. 10, 2017

(54) CABLE ASSEMBLY HAVING ELECTRICAL POWER CONDUCTORS AND FIBER OPTIC DATA LINES

(71) Applicant: CCS Technology, Inc., Wilmington, DE (US)

(72) Inventor: Michael Wimmer, Berlin (DE)

(73) Assignee: CCS Technology, Inc., Wilmington, DE (US)

( * ) Notice: Subject to any disclaimer, the term of this patent is extended or adjusted under 35 U.S.C. 154(b) by 113 days.

(21) Appl. No.: 14/811,915

(22) Filed: Jul. 29, 2015

(65) Prior Publication Data
US 2015/0331213 A1    Nov. 19, 2015

Related U.S. Application Data

(63) Continuation of application No. PCT/US2014/013502, filed on Jan. 29, 2014.

(30) Foreign Application Priority Data

Feb. 1, 2013  (EP) ..................................... 13153719

(51) Int. Cl.
G02B 6/44       (2006.01)
H01B 11/22      (2006.01)
(Continued)

(52) U.S. Cl.
CPC ........... *G02B 6/4465* (2013.01); *G02B 6/442* (2013.01); *G02B 6/443* (2013.01); *G02B 6/4422* (2013.01);
(Continued)

(58) Field of Classification Search
CPC ...... G02B 6/442; G02B 6/4422; G02B 6/443; G02B 6/4471; H01B 11/22; H02G 15/117; H02G 13/40
(Continued)

(56) References Cited

U.S. PATENT DOCUMENTS 4,805,979 A    2/1989  Bossard et al.
4,896,939 A    1/1990  O'Brien
(Continued)

FOREIGN PATENT DOCUMENTS

CN    101587215 A    11/2009
CN    102195192 A     9/2011
(Continued)

OTHER PUBLICATIONS

European Search Report for Application No. 13153719.3, dated Jul. 5, 2013, 6 pages.
(Continued)

*Primary Examiner* — Tho G Phan
(74) *Attorney, Agent, or Firm* — William D. Doyle (57) ABSTRACT

A cable assembly with electrical conductors and fiber optic lines includes a hybrid cable, electrical tethers, a fiber optic tether, and a joining location thereof that includes a shielding unit establishing an electrical contact between shielding of the hybrid cable and shielding of the respective electrical tether cables. The shielding unit includes a central body of an conductive material surrounding the hybrid and tether cables at the joining location, where the central body is in electrical contact with the shielding of the hybrid cable and with the shielding of each electrical tether.

20 Claims, 8 Drawing Sheets

(51) Int. Cl.
*H02G 15/117* (2006.01)
*H01Q 1/50* (2006.01)
*H02G 13/00* (2006.01)

(52) U.S. Cl.
CPC ............... *H01B 11/22* (2013.01); *H01Q 1/50* (2013.01); *H02G 15/117* (2013.01); *H02G 13/40* (2013.01)

(58) Field of Classification Search
USPC ..... 343/905, 906; 385/101, 107, 135, 86, 87
See application file for complete search history.

(56) References Cited

U.S. PATENT DOCUMENTS

| | | |
|---|---|---|
| 5,121,458 A | 6/1992 | Nilsson et al. |
| 5,237,635 A | 8/1993 | Lai |
| 5,271,080 A | 12/1993 | Hopper et al. |
| 5,428,187 A | 6/1995 | Crane et al. |
| 5,648,961 A | 7/1997 | Ebihara |
| 6,130,978 A | 10/2000 | Limbert et al. |
| 7,677,813 B2 | 3/2010 | Anrig et al. |
| 8,147,147 B2 | 4/2012 | Khemakhem et al. |
| 8,842,954 B2 * | 9/2014 | Burris ................ G02B 6/4415 385/101 |
| 9,606,320 B2 * | 3/2017 | Wang .................... G02B 6/4471 |
| 9,618,718 B2 * | 4/2017 | Islam ................... G02B 6/4416 |
| 9,640,986 B2 * | 5/2017 | Politis .................... H02H 9/041 |
| 2011/0021072 A1 | 1/2011 | Purdy |
| 2011/0286704 A1 | 11/2011 | Rubinstein et al. |
| 2012/0129387 A1 | 5/2012 | Holland et al. |
| 2012/0237167 A1 | 9/2012 | Lu et al. |
| 2013/0016948 A1 | 1/2013 | Smith et al. |
| 2014/0064680 A1 * | 3/2014 | Register, III ......... G02B 6/4416 385/101 |
| 2014/0334786 A1 * | 11/2014 | O'Day ................ G02B 6/4417 385/101 |

FOREIGN PATENT DOCUMENTS

| | | |
|---|---|---|
| CN | 102522662 A | 6/2012 |
| DE | 19620432 A1 | 11/1997 |
| EP | 2360503 A1 | 8/2011 |
| WO | 2012038104 A1 | 3/2012 |

OTHER PUBLICATIONS

Patent Cooperation Treaty, International Search Report for PCT/US14/13502, mail date May 19, 2014, 10 pages.
Patent Cooperation Treaty, International Preliminary Report on Patentability for PCT/US14/13502, mail date Aug. 4, 2015, 8 pages.

* cited by examiner

CABLE ASSEMBLY HAVING ELECTRICAL POWER CONDUCTORS AND FIBER OPTIC DATA LINES

RELATED APPLICATIONS

This application is a continuation of PCT/US14/13502, filed Jan. 29, 2014, which claims the benefit of priority under 35 U.S.C. §119 of European Patent Application Serial No. 13153719.3, filed on Feb. 1, 2013, the content of which is relied upon and incorporated herein by reference in its entirety.

BACKGROUND

Field of the Disclosure

The present disclosure generally relates to a cable assembly having electrical power conductors and fiber optic data lines. Further on, the present disclosure generally relates to a power and communication system including such a cable assembly.

Technical Background

The present disclosure relates especially to FTTA (Fiber-To-The-Antenna) applications. Within an FTTA application, a power and communication system may include an antenna, where the antenna has a base station and a transmitter station. A cable assembly extends from the base station of the antenna to the transmitter station of the antenna, where the cable assembly includes electrical power conductors for providing electrical power from the base station to the or each transmitter station and includes fiber optic data lines for transmitting data signals between the base station to the transmitter station.

WO 2012/038104 A1 discloses a cable assembly having electrical power conductors and fiber optic data lines. This prior art cable assembly includes a hybrid cable having first electrical power conductors and first fiber optic data lines. This prior art cable assembly further comprises a plurality of electrical tether cables having second electrical power conductors and a fiber optic tether cable having second fiber optic data lines. In addition, this prior art cable assembly includes a joining location. The first electrical power conductors of the hybrid cable are connected with the second electrical power conductors of the electrical tether cable at the joining location. Further, first fiber optic data lines of the hybrid cable are connected with the second fiber optic data lines of the fiber optic tether cable at the joining location. According to WO 2012/038104 A1, the joining location is provided by a breakout enclosure in form of a box or a can.

In an FTTA application, the transmitter station of the antenna may be located on high structures, such as on top of a building or a tower. Due to this location, a risk of damage by a lightning strike is considerable. The cable assembly known from WO 2012/038104 A1 appears to be insufficiently protected against damage by a lightning strike.

The present patent application is based on the problem of providing a novel cable assembly and a novel power and communication system being sufficiently protected against damage by a lightning strike.

The furcation or joining location of the cable assembly comprises a shielding unit establishing an electrical contact between the shielding element of the hybrid cable and the shielding elements of the respective electrical tether cables, wherein the shielding unit comprises a central body made from an electrical conductive material surrounding the hybrid cable and tether cables in the region of the furcation or joining location, and wherein the central body is in electrical contact with the shielding element of the hybrid cable and with the shielding element of each electrical tether cable. Such a cable assembly is sufficiently protected against damage by a lightning strike. The shielding unit provides in longitudinal direction of the cable assembly a 360° shielding of all electrical power conductors and avoids an electrical overload on the power conductors due to lightning effects. The shielding unit protects the electrical power conductors against an electromagnetic impulse and transmits a lightning current to ground.

Preferably, the shielding unit further comprises a first nut-like body made from an electrical conductive material being fastenable to a first end of the central body in the region of the hybrid cable providing an electrical contact with the shielding element of the hybrid cable, and a second nut-like body made from an electrical conductive material being fastenable to a second end of the central body in the region of the tether cable providing an electrical contact with the shielding element of each electrical tether cable. This modular design of the shielding unit allows the adaption of the shielding unit and thereby of the cable assembly to different cable diameters of the hybrid cable and/or to different numbers of tether cables.

According to an improved embodiment, the shielding unit further comprises a first compression element made from an electrical conductive material being positioned between first nut-like body and the hybrid cable, wherein the first compression element becomes compressed when the first nut-like body becomes fastened to the central body such that the compressed first compression element provides an electrical conductive path between the shielding element of the hybrid cable and the central body. This improves the electrical connection of the shielding unit with the shielding element of the hybrid cable and improves protection against damage by a lightning strike.

According to a further improved embodiment, the shielding unit further comprises a second compression element made from an electrical conductive material being positioned between second nut-like body and the tether cables, wherein the second compression element becomes compressed when the second nut-like body becomes fastened to the central body such that the compressed second compression element provides an electrical conductive path between the shielding elements of the electrical tether cables and the central body. This improves the electrical connection of the shielding unit with the shielding element of each electrical tether cable and further improves protection against damage by a lightning strike.

According to a further improved embodiment, the shielding unit further comprises a separator element made from an electrical conductive material, wherein the separator element comprises recesses for receiving the electrical tether cables, and wherein the electrical tether cables become pressed into the recesses of the separator element when the second compression element becomes compressed, thereby providing an electrical conductive path on the one hand between the shielding elements of the electrical tether cables and the central body, and on the other hand between the shielding elements of the electrical tether cables and the separator element. The separator element ensures that the shielding elements of the power tether cables are kept in the right position, thereby further improving the electrical connection of the shielding unit with the shielding elements of the electrical tether cables and thereby further improving the protection against damage by a lightning strike.

Preferably, the separator element of the shielding unit comprises an opening for receiving and contacting a grounding wire. This further improves protection against damage by a lightning strike.

Preferably, the shielding unit is filled with an insulation material. The insulation material further improves protection against damage by a lightning strike and provides strain relief for the hybrid cable and tether cables.

Preferably, the shielding unit is over-molded. The over-mold seals the hole joining point against environmental influences like water and dust

BRIEF DESCRIPTION OF THE DRAWINGS

Embodiments of the fiber optic distribution device are given in the description below. Exemplary embodiments will be explained in more detail with reference to the drawings, in which.

DETAILED DESCRIPTION

FIGS. 1 to 7 show different views and details of a cable assembly 10 with electrical power conductors and fiber optic data lines according to a first embodiment of the pre-sent patent application.

A cable assembly 10 according an exemplary embodiment comprises a hybrid cable 11, a plurality of electrical tether cables 12, at least one fiber optic tether cable 13 and a joining location 14 at which the electrical tether cables 12 and at least one fiber optic tether cable 13 are connected to the hybrid cable 11.

In the embodiment of FIGS. 1 to 7, the cable assembly 10 comprises one hybrid cable 11, three electrical tether cables 12 and one fiber optic tether cable 13.

The hybrid cable 11 has first electrical power conductors 15 and at least one first fiber optic data line 16, wherein the first electrical power conductors 15 and the or each first fiber optic data line 16 of the hybrid cable 11 are commonly surrounded by a shielding element 17 and by an outer cable jacket 18 of the hybrid cable 11.

Each of the electrical tether cable 12 has second electrical power conductors 19 being surrounded by a shielding element 20 of the respective electrical tether cable 12 and by an outer cable jacket 21 of the respective electrical tether cable 12. The fiber optic tether cable 13 has at least one second fiber optic data line 22 being surrounded by a an outer cable jacket 23 of the optical tether cable 13.

In the embodiment of FIGS. 1 to 7, the hybrid cable 11 has six first electrical power conductors 15 and one first fiber optic data line 16. In the embodiment of FIGS. 1 to 7, each of the electrical tether cable 12 has two second electrical power conductors 19 and the one fiber optic tether cable 13 has one second fiber optic data line 22.

The first electrical power conductors 15 of the hybrid cable 11 are connected with the second electrical power conductors 19 of the electrical tether cables 12 at adjacent ends of the hybrid cable 11 and electrical tether cables 12, namely at the joining location 14. Further on, the first fiber optic data line 16 of the hybrid cable 11 is connected with the second fiber optic data line 22 of the fiber optic tether cable 13 at adjacent ends of the hybrid cable 11 and fiber optic tether cable 13, namely at the joining location 14.

Figure 1:
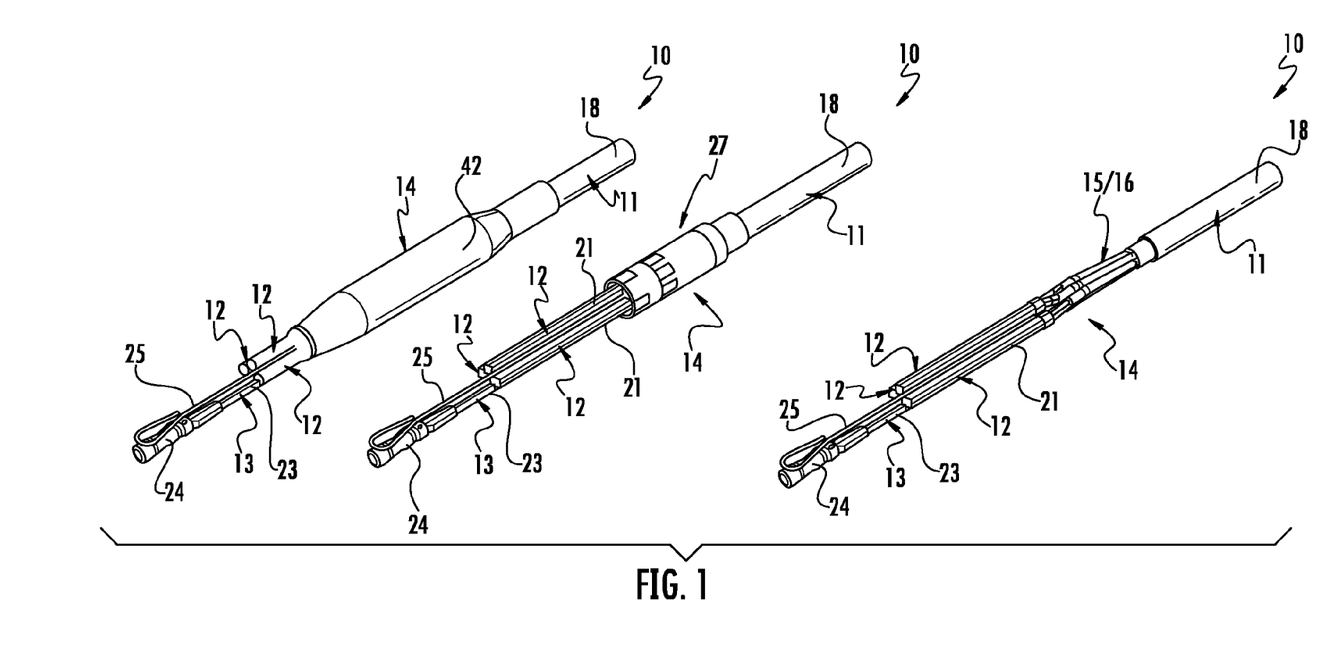
FIG. 1 shows different views of a cable assembly with electrical power conductors and fiber optic data lines according to a first embodiment.
Figure 2:
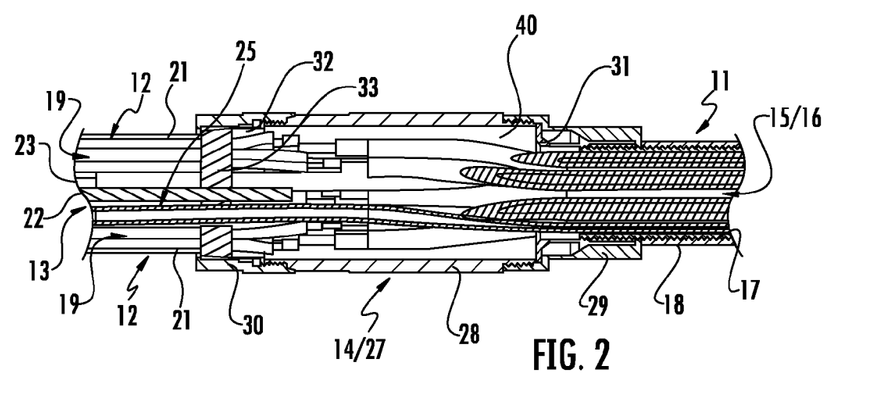
FIG. 2 shows a first cross-section through the cable assembly according to FIG. 1.
Figure 3:
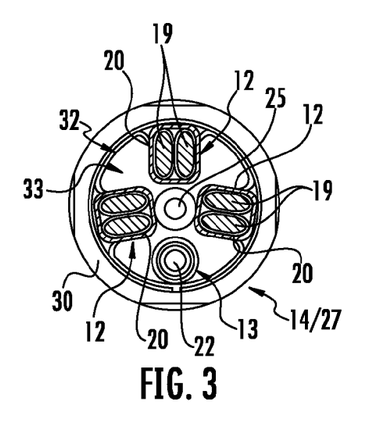
FIG. 3 shows a second cross-section through the cable assembly according to FIG. 1.
Figures 4, 5:
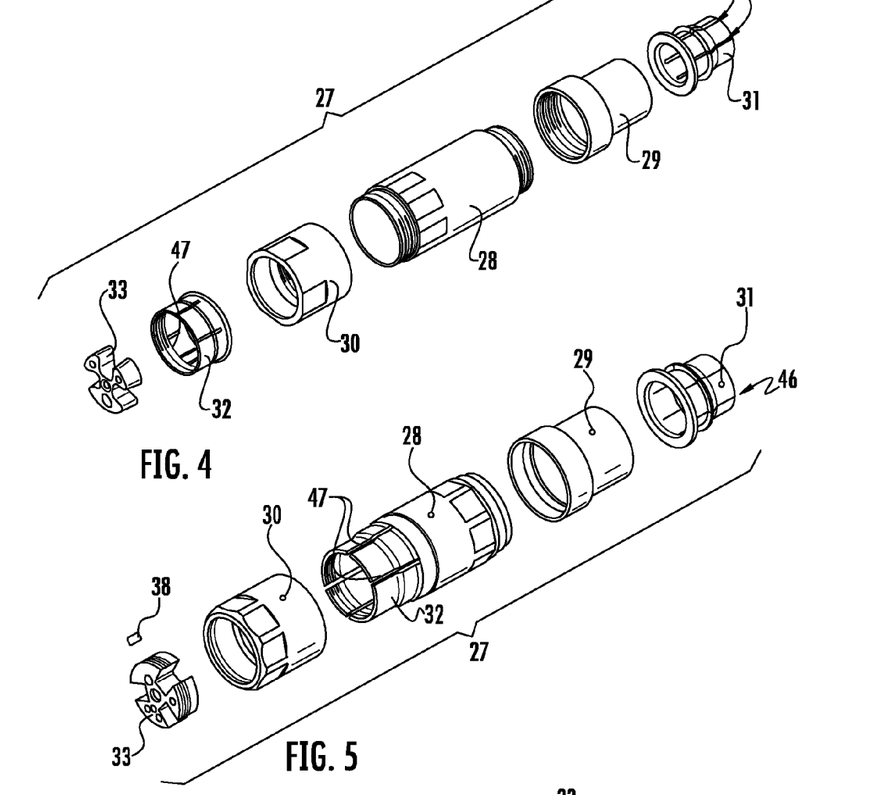
FIG. 4 shows an exploded view of a modular shielding unit of the cable assembly according to FIG. 1.
FIG. 5 shows an exploded view of an alternative modular shielding unit.

According to FIG. 1, the fiber optic tether cable 13 is connectorized with a fiber optic connector 24 at an end of the fiber optic tether cable 13 being opposite to the end at the joining location 14.

In the embodiment of FIGS. 1 to 7, the cable assembly 10 further comprises a pulling element 25 with a pulling grip 26, which can be used to install the cable assembly 10 within a cable duct. The pulling grip 26 is positioned at the end of the cable assembly 10 at which the fiber optic tether cable 13 comprises the fiber optic connector 24.

The joining location 14 comprises a modular shielding unit 27 establishing an electrical contact between the shielding element 17 of the hybrid cable 11 and the shielding elements 20 of the respective electrical tether cables 12. The modular shielding unit 27 comprising at least a central body 28 and in addition preferably a first nut-like body 29 and a second nut-like body 30, all made from an electrical conductive material.

The central body 28 surrounds in longitudinal direction of the cable assembly 10 the hybrid cable 11 and tether cables 12 and 13 at the joining location 14.

The central body 28 surrounds at least the connections between the electrical power conductors 15 of the hybrid cable 11 and the electrical power conductors 19 of the electrical tether cables 12. The central body 28 is in electrical contact with the shielding element 17 of the hybrid cable 11 and with the shielding element 20 of each electrical tether cable 12.

The central body 28 may further surround the connection between the first fiber optic data line 16 of the hybrid cable 11 and the second fiber optic data line 22 of the fiber optic tether cable 13. However, the connection between the first fiber optic data line 16 of the hybrid cable 11 and the second fiber optic data line 22 of the fiber optic tether cable 13 is preferably positioned offset from outside of the central body 28.

The first nut-like body 29 is fastenable, preferably screwable or alternatively rivetable or weldable, to a first end of the central body 28 in the region of the hybrid cable 11 providing an electrical contact with the shielding element 17 of the hybrid cable 11. The second nut-like body 30 is fastenable, preferably screwable or alternatively rivetable or weldable, to a second end of the central body 28 in the region of the tether cables 12, 13 providing an electrical contact with the shielding element 20 of each electrical tether cable 12.

This provides a secure electrical contact between the shielding element 17 of the hybrid cable 11 and the shielding elements 20 of the electrical tether cables 12. All electrical power conductors 15, 19 of the hybrid cable 11 and the power tether cables 12 are covered and 360° shielded by the modular shielding unit 27.

Preferably, the modular shielding unit 27 further comprises a first compression element 31 being positioned between first nut-like body 29 and the hybrid cable 11, a second compression element 32 being positioned between second nut-like body 30 and the tether cables 12, 13, and a separator element 33 being positioned in the region of the second nut-like body 30 for separating the tether cables 12, 13. The first compression element 31, the second compression element 32 and the separator element 33 are all made from an electrical conductive material.

The first compression element 31 becomes automatically compressed when the first nut-like body 29 becomes fastened to the central body 28 such that the compressed first compression element 31 provides an electrical conductive path between the shielding element 17 of the hybrid cable 11 and the central body 28. In some embodiments, the first compression element 31 comprises slots 46 running in longitudinal direction of the same allowing a radial compression of the first compression element 31 while the first nut-like body 29 becomes fastened to the central body 28.

The second compression element 32 becomes automatically compressed when the second nut-like body 30 becomes fastened to the central body 28 such that the compressed second compression element 32 provides an electrical conductive path between the shielding elements 21 of all electrical tether cables 12 and the central body 28. The second compression element 32 may comprise slots 47 running in longitudinal direction of the same allowing a radial compression of the second compression element 32 while the second nut-like body 30 becomes fastened to the central body 28.

According to an exemplary embodiment, the first compression element 31 is a separate element of the modular shielding unit 27. The second compression element 32 is preferably an integral element of the central body 28 (see FIG. 5). However, it is also possible that the second compression element 32 is a separate element of the modular shielding unit 27 (see FIG. 4).

The central body 28, the first nut-like body 29, and the second nut-like body 30 as well as the first compression element 31 and the second compression element 32 have, in the longitudinal direction of the cable assembly, an almost cylindrical outer shape. The compression elements 31, 32 can be pushed into the nut-like bodies 29, 30 and the nut-like bodies can be screwed on the central body or otherwise fastened thereto. This ensures an easy and reliable assembly. The central body 28, the nut-like bodies 29, 30 and the compression elements 31, 32 may all be manufactured by lathing.

It is preferred to screw the nut-like bodies 29, 30 on the central body 28. However it is also possible to fasten the same together in a different way, e.g. by ratcheting flanges on the central body with deflective features, such as a pawl, on the nut-like bodies 29, 30.

The separator element 33 may be positioned in the region of the second compression element 32. The separator element 33 has a disk-like basic body 34 providing outer recesses 35 for receiving the electrical tether cables 12. The outer recesses 35 for receiving the electrical tether cables 12 are provided at the outer circumference of the disk-like basic body 34. In the embodiment of FIGS. 1 to 7, the disk-like basic body 34 of the separator element 33 provides three outer recesses 35 each for receiving one of the three electrical tether cables 12.

According to an exemplary embodiment, the electrical tether cables 12 become inserted into the recesses 35 in radial direction of the disk-like basic body 34. The electrical tether cables 12 become pressed into the recesses 35 of the separator element 33 when the second compression element 32 becomes compressed, thereby providing on the one hand an electrical conductive path between the shielding element 20 of each electrical tether cable 12 and the central body 28, and on the other hand between the shielding element 20 of each electrical tether cable 12 and the separator element 33. The separator element 33 keeps the shielding elements 20 of the power tether cables 12 in the right position, thereby further improving the electrical connection of the shielding unit 27 with the shielding elements 20 of the electrical tether cables 12.

The separator element 33 further comprises at least one through hole 36 or other aperture for receiving at least one fiber optic tether cable 13. In the embodiment of FIGS. 1 to 7, the disk-like basic body 34 of the separator element 33 provides one through hole 36 for receiving the one fiber optic tether cable 13.

Figure 7:
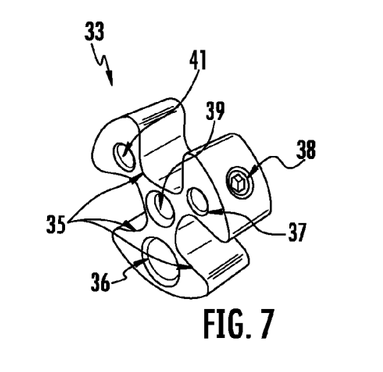
FIG. 7 shows a separator element of the modular shielding unit of the cable assembly according to FIG. 1.
Figure 8:
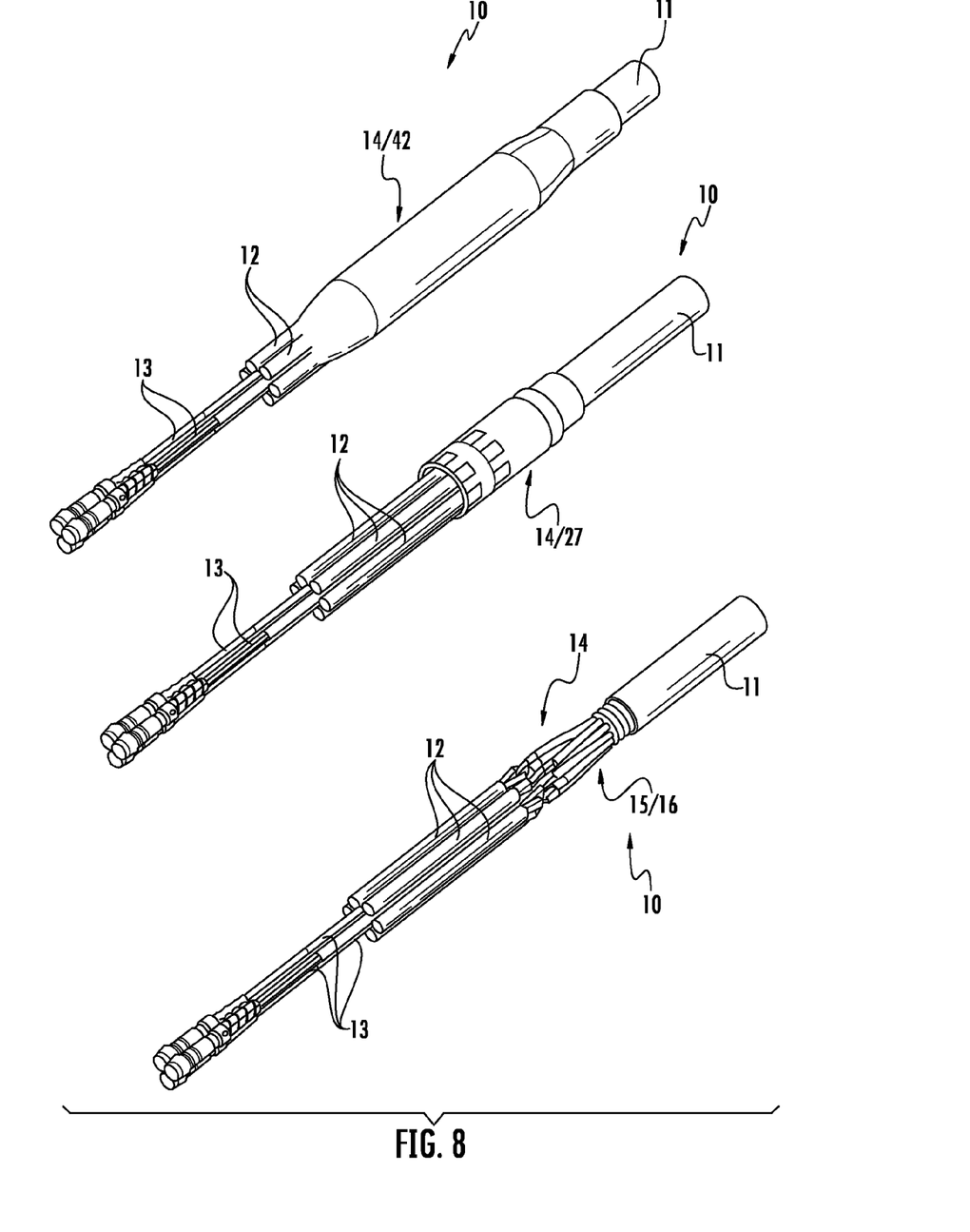
FIG. 8 shows different views of a cable assembly with electrical power conductors and fiber optic data lines according to a second embodiment.
Figure 9:
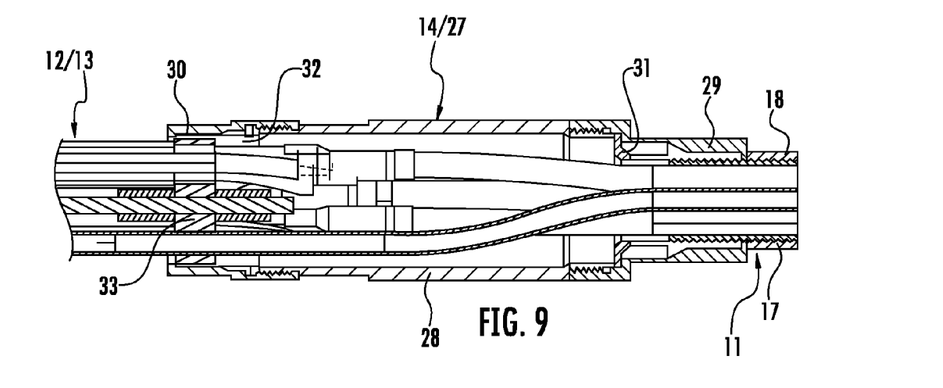
FIG. 9 shows a cross-section through the cable assembly according to FIG. 8.
Figure 10:
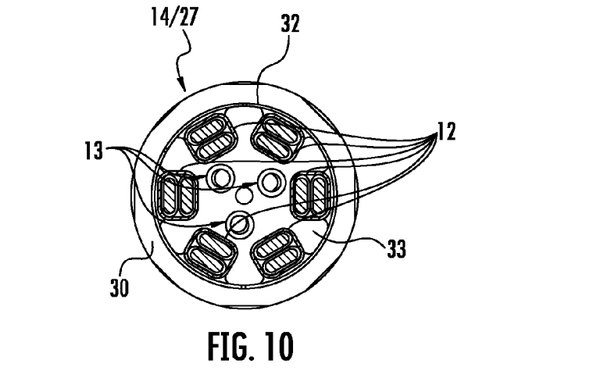
FIG. 10 shows another cross-section through the cable assembly according to FIG. 8.
Figure 11:
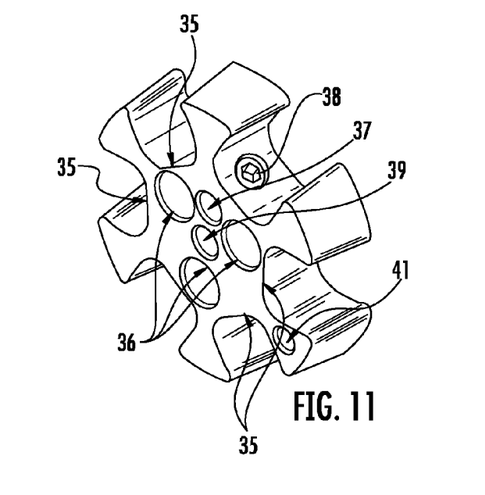
FIG. 11 shows a separator element of the modular shielding unit of the cable assembly according to FIG. 8.
Figure 12:
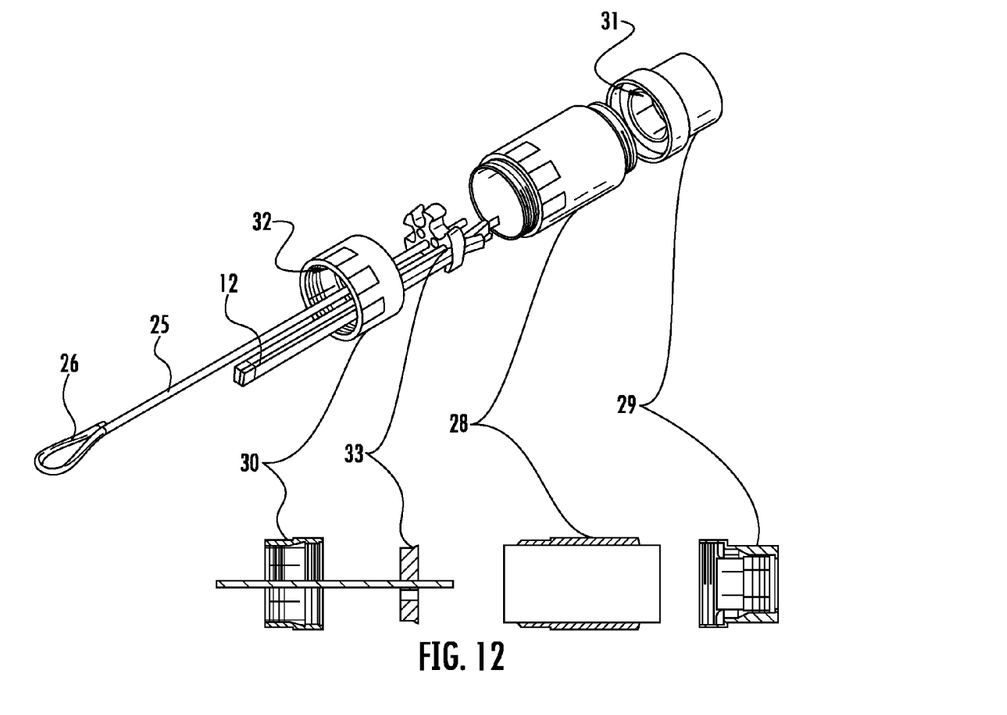
FIG. 12 shows additional views of the cable assembly according to FIG. 8.
Figure 15:
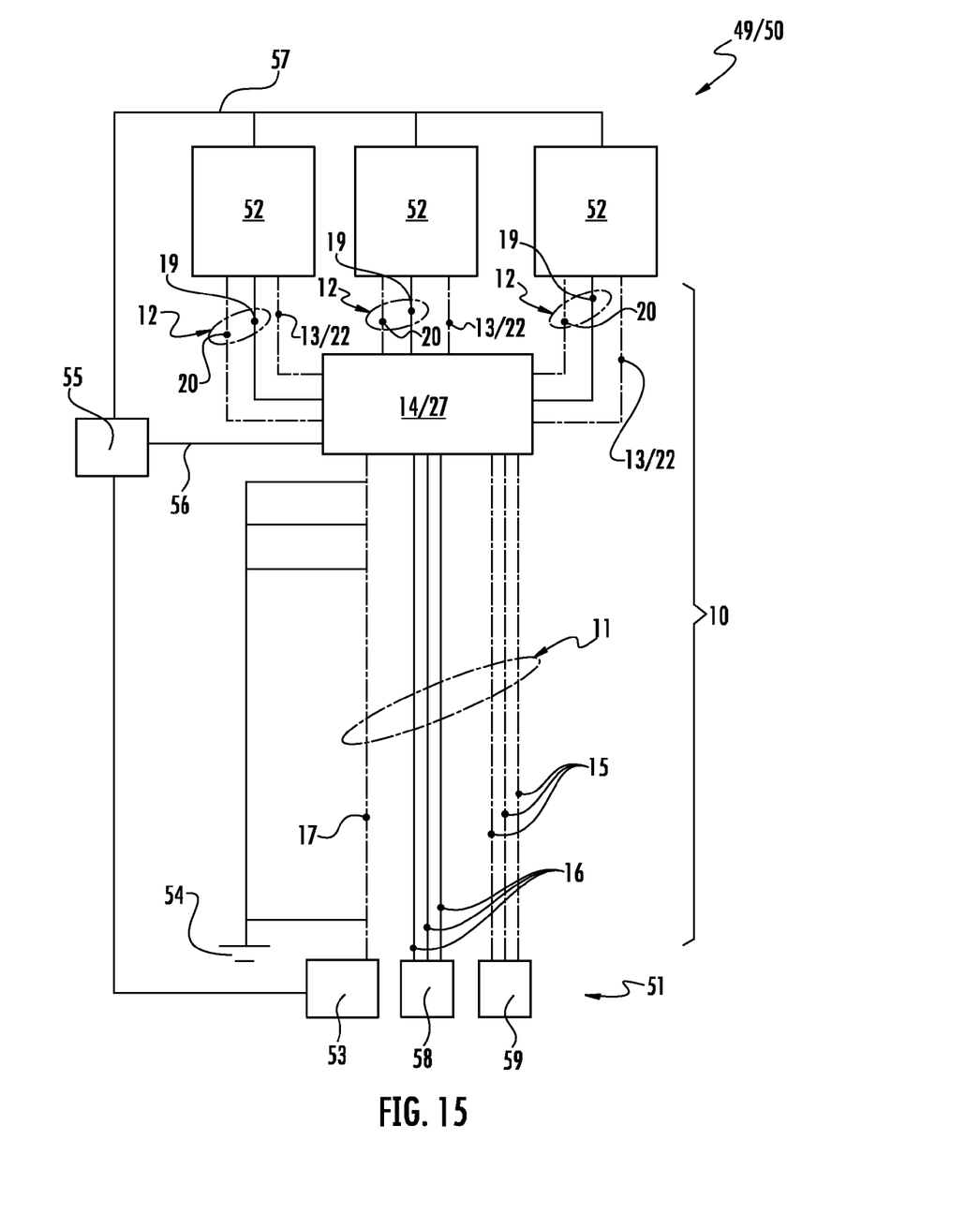
FIG. 15 shows a schematic diagram of a power and communication system according an exemplary embodiment.

The separator element 33 further comprises an opening 37 for receiving and contacting a grounding wire 56 (see FIG. 15). The grounding wire is made from an electrical conductive material and becomes inserted into the opening 37 and fixed within the opening by a set screw 38 or other fastener.

Thereby, an electrical conductive path is established between the grounding wire 56 and the shielding elements 17, 20 of the hybrid cable 11 and the electrical tether cables 12 through the modular shielding unit 27.

The separator element 33 further comprises a through hole 39 or other aperture for receiving the pulling element 25.

Figure 6:
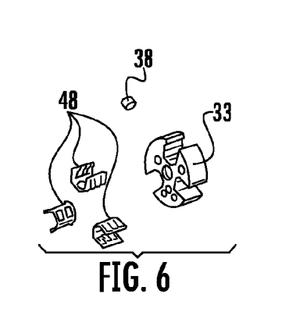
FIG. 6 shows an alternative detail for FIGS. 4 and 5.

As shown in FIG. 6, it is possible to have guiding elements 48 positioned with the recesses 35 of the separator element 33 before the electrical tether cables 12 become inserted into the recesses 35. Such guiding elements 48 may be made from an electrically conductive material and may further improve the electrical contact between the separator element 33 and the shielding elements 20 of the electrical tether cables 12.

The modular shielding unit 27 is preferably filled with an insulation material 40. The insulation material is preferably a duroplast material.

After connecting the electrical power conductors 15, 19 and the fiber optic data lines 16, 22 of the hybrid cable 11 and the tether cables 12, 13 and after assembling the modular shielding unit 27, free space of the same becomes filled with the insulation material 40. The separator element 33 comprises a through hole 41 or other aperture for injecting the insulation material 40 into the free space of the modular shielding unit 27. The insulation material 40 improves the shielding and provides strain relief. When the cable assembly 10 is pulled though a cable duct or the like, the weight of the hybrid cable 11 may causes a high mechanical load. In some embodiments, the pulling force needs to become transmitted through the shielding unit 27 of the joining point 14 to the hybrid cable 11. The optical and electrical connection is protected against this mechanical stress by the insulation material 40. It is possible to transmit the complete mechanical load through the shielding unit 27.

The joining location 14 is preferably over-molded by an over-mold 42. The over-mold 42 is preferably a duroplast material. The over-mold 42 seals the entire joining location 14 against environmental influences like water an dust.

The joining location 14 comprising the shielding unit 27 and the over-mold 42 is characterized by small dimensions allowing an easy transportation and installation of the cable assembly.

For example, in some embodiments the cable assembly is sized to fit through a cylindrical duct having a 15 cm diameter or narrower, such as a duct having a 12 cm diameter or narrower, and in some such embodiments even a duct having a 10 cm diameter or narrower. The narrow profile allows the cable assembly to maneuver through tight spaces, as may be present in a telecommunications antenna tower, allowing for ideal placement of the cable assembly and ease of installation. Further, the narrow profile may reduce drag loads on the cable assembly when perched in an antenna tower, such as in windy storms, allowing for less bulky constraints on and/or housing of the cable assembly. However, in other contemplated embodiments, the cable assembly may be too large to fit through such ducts.

FIGS. 8 to 12 show different views and details of a cable assembly 10 with electrical power conductors and fiber optic data lines according to a second embodiment. In order to avoid unnecessary repetitions, for identical parts identical reference signs are used and reference is made to the above description of the embodiment of FIGS. 1 to 7. Only the differences between the embodiment of FIGS. 8 to 12 and the embodiment of FIGS. 1 to 7 will be described below.

In the embodiment of FIGS. 8 to 12, the cable assembly 10 comprises one hybrid cable 11, six electrical tether cables 12 and three fiber optic tether cables 13. The hybrid cable 11 has twelve first electrical power conductors 15 and three first fiber optic data lines 16. Each of the electrical tether cables 12 has two second electrical power conductors 19 and each of the fiber optic tether cables 13 has one second fiber optic data line 22.

Each of the fiber optic tether cables 13 comprises one fiber optic connector 24. In the embodiment of FIGS. 8 to 12, the disk-like basic body 34 of the separator element 33 provides six outer recesses 35 each for receiving one of the three electrical tether cables 12. The disk-like basic body 34 of the separator element 33 provides further three through holes 36 or other apertures each for receiving one fiber optic tether cable 13.

Figure 13:
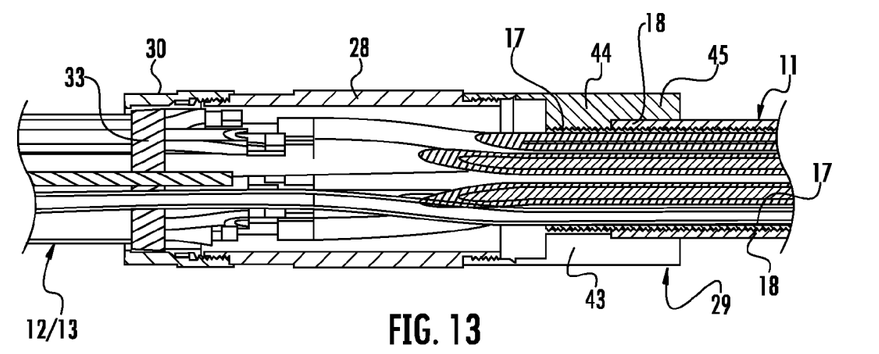
FIG. 13 shows a cross-section through a cable assembly with electrical power conductors and fiber optic data lines according to a third embodiment.
Figure 14:
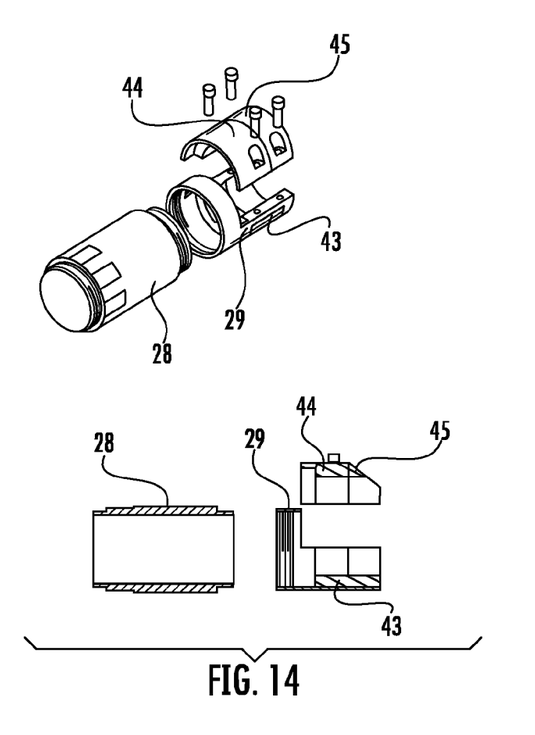
FIG. 14 shows an exploded view of some elements of a modular shielding unit of the cable assembly according to FIG. 13.

FIGS. 13 and 14 show different views and details of a cable assembly 10 with electrical power conductors and fiber optic data lines according to a third embodiment. In order to avoid unnecessary repetitions, for identical parts identical reference signs are used and reference is made to the above description of the embodiment of FIGS. 1 to 7. Only the differences between the embodiment of FIGS. 13 and 14 and the embodiment of FIGS. 1 to 7 will be described below.

In the embodiment of FIGS. 13 and 14, the first nut-like body 29 of the modular shielding unit 27 which is fastenable to the central body 28 of the modular shielding unit 27 comprises three separate elements.

A first element provides a basic section 43 of the first nut-like body 29 which is used to fasten the first nut-like body 29 to the central body 28.

A second element provides a compression section 44 which is fastenable to the basic section 43 to become pressed against the insulation element 17 of the hybrid cable 11 and to provide the electrical contact between the insulation element 17 of the hybrid cable 11 and the central body 28 of the modular shielding unit 27.

The modular shielding unit 27 of the embodiment of FIGS. 13 and 14 does not comprise the first compression element 31 of the embodiment of FIGS. 1 to 7. The compression section 44 provides the function of the first compression element 31.

A third element provides another compression section 45 which is fastenable to the basic section 43 to become pressed against the outer cable jacket 18 of the hybrid cable 11 and to provide additional strain relief for the hybrid cable 11.

The cable assembly 10 is preferably used in FTTA (Fiber-To-The-Antenna) applications as part of a power and communication system 49. Such a power and communication system 49 (see FIG. 15) comprises an antenna 50, wherein the antenna 50 has a base station 51 and at least one transmitter station 52.

A cable assembly 10 extends from the base station 51 of the antenna 50 to the each transmitter station 52 of the antenna 50.

The cable assembly 10 comprises the electrical power conductors 16, 19 for providing electrical power from the base station 51 to the or each transmitter station 52 and the fiber optic data lines 16, 22 for transmitting data signals between the base station 51 to the or each transmitter station 52.

The cable assembly 10 has been described above in detail. Reference is made to the above description of FIGS. 1 to 14.

The cable assembly 10 extending between the base station 51 of the antenna 50 and the transmitter station 52 of the antenna 50 provides a 360° shielding of all electrical power conductors 15, 20 and avoids an electrical overload on the power conductors 15, 20 due to lightning effects. The shielding unit 27 protects the power conductors 15, 20 against an electromagnetic impulse and transmits a lightning current to ground.

In the region of the base station 51 the shielding element 17 of the hybrid cable 11 is connected to an EBB (Equal potential Bonding Bar) unit 53 of the base station 51. The EBB unit 53 of the base station 51 connects the shielding element 17 of the hybrid cable 11 to ground in the region of the base station 51. In addition, along the longitudinal extension of the hybrid cable 11 the shielding element 17 of the hybrid cable 11 is connected to ground 54 in regular distances. Further on, in the region of the base station 51 the electrical power conductors 16 of the hybrid cable 11 are connected to a SPD (Surge Protection Device) unit 58 and the fiber optic data lines 16 of the hybrid cable 11 are connected to a fiber optic distribution unit 59.

The SPD unit 58 of the base station 51 provides surge protection for the electrical power conductors 15 of the hybrid cable 11. The fiber optic distribution unit 59 of the base station 51 can be provided by a patch panel and/or by splice trays.

In the region of each transmitter station 52, the shielding element 20 of the respective electrical tether cable 12 is connected to a LPS (Lightning Protection System) unit (not shown) of the respective transmitter station 52 and through said LPS unit and a grounding wire 57 to a second EBB unit 55.

The grounding wire 57 extends between the second EBB unit 55 and the LPS unit at each transmitter station 52.

According to such an exemplary embodiment, the ground path the overall cable assembly has a capacity of at least 50 kA, such as at least 100 kA, or even at least 300 kA, allowing for controlled guidance of a lightning bolt.

In the region of the joining location 14 the shielding elements 20 of the electrical tether cables 12 and the shielding element 17 of the hybrid cable 11 are connected to the second EBB unit 55, namely through the grounding wire 56 extending between the second EBB unit 55 and the shielding unit 27, namely the separator element 33 of the shielding unit 27.

Such a power and communication system 49 or antenna 50 is sufficiently protected against damage by a lightning strike.

As described above, the cable assembly 10 comprising the hybrid cable 11 and the tether cables 12 and 13 has preferably a joining location 14. In such a joining location 14 the first electrical power conductors 15 of the hybrid cable 11 are connected with the second electrical power conductors 19 of the electrical tether cables 12, and the or each first fiber optic data line 16 of the hybrid cable 11 is connected with the second fiber optic data line 22 of the or each fiber optic tether cable 13.

It should be noted that it is alternatively possible that the cable assembly 10 comprises a simple furcation location in which the first electrical power conductors 15 of the hybrid cable 11 are branched off to the second electrical power conductors 19 of the electrical tether cables 12 without connections between the same, and in which the or each first fiber optic data line 16 of the hybrid cable 11 is branched off to the second fiber optic data line 22 of the or each fiber optic tether cable 13 without connection between the same.

What is claimed is:

1. A cable assembly with electrical power conductors and fiber optic data lines, the cable assembly comprising:
    a hybrid cable comprising: first electrical power conductors, a first fiber optic data line, and a shielding element of the hybrid cable, wherein the first electrical power conductors and the first fiber optic data line are surrounded by the shielding element of the hybrid cable;
    a plurality of electrical tether cables comprising: second electrical power conductors, a fiber optic tether cable having a second fiber optic data line, and a shielding element of the respective electrical tether cable, wherein the second electrical power conductors of each electrical tether cable are surrounded by the shielding element of the respective electrical tether cable;
    a shielding unit associated with a joining location wherein the first electrical power conductors of the hybrid cable are connected with the second electrical power conductors of the electrical tether cables at the joining location, and wherein the first fiber optic data line of the hybrid cable is connected with the second fiber optic data line of the fiber optic tether cable at the joining location, the shielding unit establishing an electrical contact between the shielding element of the hybrid cable and the shielding elements of the respective electrical tether cables, wherein the shielding unit comprises a central body made from an electrical conductive material surrounding the hybrid cable and the tether cables in the region of the joining location, and wherein the central body is in electrical contact with the shielding element of the hybrid cable and with the shielding element of each electrical tether cable.

2. The cable assembly of claim 1, wherein the shielding unit further comprises:
    a first nut-like body made from an electrical conductive material being fastenable to a first end of the central body in the region of the hybrid cable providing an electrical contact with the shielding element of the hybrid cable;
    a second nut-like body made from an electrical conductive material being fastenable to a second end of the central body in the region of the tether cables providing an electrical contact with the shielding element of each electrical tether cable.

3. The cable assembly of claim 2, wherein the shielding unit further comprises a first compression element made from an electrical conductive material being positioned between first nut-like body and the hybrid cable, wherein the first compression element becomes compressed when the first nut-like body becomes fastened to the central body such that the compressed first compression element provides an electrical conductive path between the shielding element of the hybrid cable and the central body.

4. The cable assembly of claim 3, wherein the first compression element is a separate element.

5. The cable assembly of claim 4, wherein the shielding unit further comprises a second compression element made from an electrical conductive material being positioned between second nut-like body and the tether cables, wherein the second compression element becomes compressed when the second nut-like body becomes fastened to the central body such that the compressed second compression element provides an electrical conductive path between the shielding elements of the electrical tether cables and the central body.

6. The cable assembly of claim 5, characterized in that the second compression element is an integral element of the central body.

7. The cable assembly of claim 5, wherein the shielding unit further comprises a separator element made from an electrical conductive material, wherein the separator element comprises recesses for receiving the electrical tether cables, and wherein the electrical tether cables become pressed into the recesses of the separator element when second compression element becomes compressed thereby providing an electrical conductive path between the shielding elements of the electrical tether cables and the central body and between the shielding elements of the electrical tether cables and the separator element.

8. The cable assembly of claim 7, wherein the separator element comprises at least one through hole for receiving at least one fiber optic tether cable.

9. The cable assembly of claim 7, wherein the separator element comprises an opening for receiving and contacting a grounding wire.

10. The cable assembly of claim 7, wherein the separator element comprises a through hole for receiving a pulling element.

11. The cable assembly of claim 2, wherein the first nut-like body of the shielding unit comprises a section which becomes pressed against a cable jacket of the hybrid cable.

12. The cable assembly of claim 1, wherein the shielding unit is filled with an insulation material.

13. The cable assembly of claim 1, wherein the joining location is over-molded.

14. A power and communication system, comprising:
    an antenna, whereby the antenna comprises a base station, a transmitter station, and a cable assembly extending from the base station to the transmitter station;

wherein the cable assembly is provided by a cable assembly of claim 1, wherein the hybrid cable is connected to base station of the antenna, and wherein the tether cables are connected to the transmitter station of the antenna.

15. The power and communication system of claim 14, wherein the shielding unit further comprises:
- a first nut-like body made from an electrical conductive material being fastenable to a first end of the central body in the region of the hybrid cable providing an electrical contact with the shielding element of the hybrid cable;
- a second nut-like body made from an electrical conductive material being fastenable to a second end of the central body in the region of the tether cables providing an electrical contact with the shielding element of each electrical tether cable.

16. The power and communication system of claim 15, wherein the shielding unit further comprises a first compression element made from an electrical conductive material being positioned between first nut-like body and the hybrid cable, wherein the first compression element becomes compressed when the first nut-like body becomes fastened to the central body such that the compressed first compression element provides an electrical conductive path between the shielding element of the hybrid cable and the central body.

17. The power and communication system of claim 16, wherein the first compression element is a separate element.

18. The power and communication system of claim 17, wherein the shielding unit further comprises a second compression element made from an electrical conductive material being positioned between second nut-like body and the tether cables, wherein the second compression element becomes compressed when the second nut-like body becomes fastened to the central body such that the compressed second compression element provides an electrical conductive path between the shielding elements of the electrical tether cables and the central body.

19. The power and communication system of claim 18, characterized in that the second compression element is an integral element of the central body.

20. The power and communication system of claim 18, wherein the shielding unit further comprises a separator element made from an electrical conductive material, wherein the separator element comprises recesses for receiving the electrical tether cables, and wherein the electrical tether cables become pressed into the recesses of the separator element when second compression element becomes compressed thereby providing an electrical conductive path between the shielding elements of the electrical tether cables and the central body and between the shielding elements of the electrical tether cables and the separator element.

* * * * *